Nov. 2, 1965    D. R. SPENCER ETAL    3,215,938
COUNTER PULSE MONITORING AND CORRECTION CIRCUIT
Filed Dec. 22, 1961    2 Sheets-Sheet 2
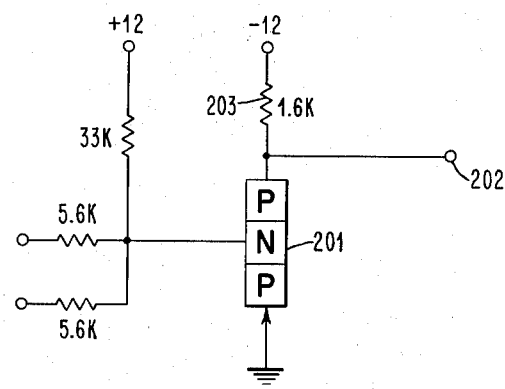
FIG. 2
TWO INPUT LOGIC BLOCK
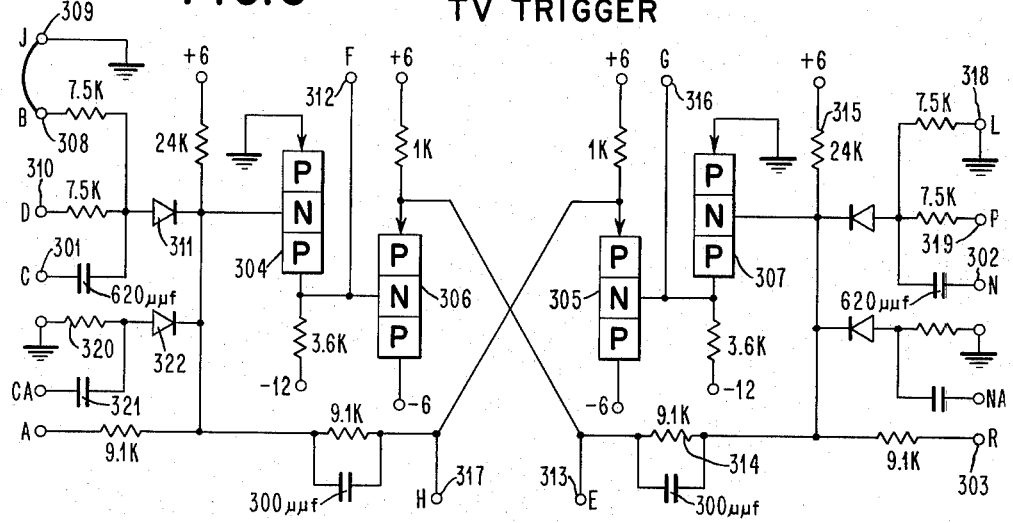
FIG. 3    TV TRIGGER
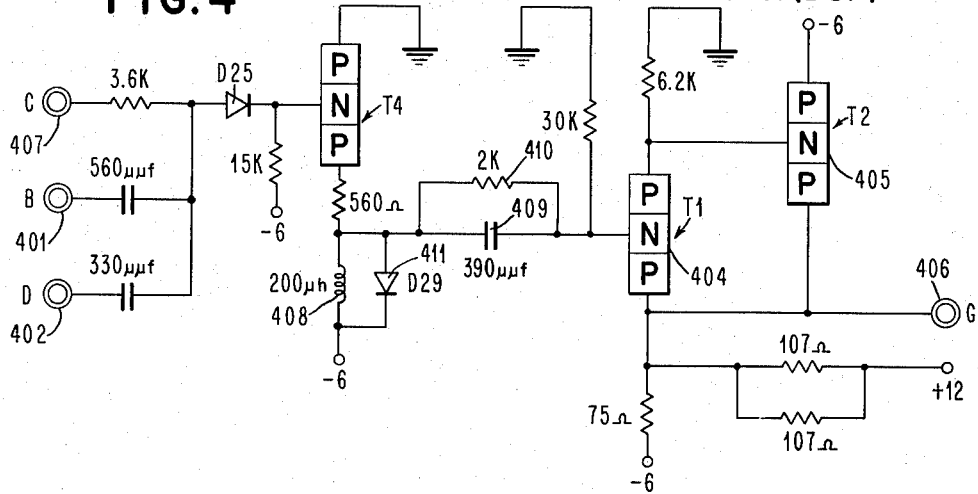
FIG. 4    GATED SAMPLE PULSE DRIVER (DSP)

United States Patent Office 3,215,938
Patented Nov. 2, 1965

3,215,938
COUNTER PULSE MONITORING AND CORRECTION CIRCUIT
Dana R. Spencer and Thomas S. Stafford, Poughkeepsie, N.Y., assignors to International Business Machines Corporation, New York, N.Y., a corporation of New York
Filed Dec. 22, 1961, Ser. No. 161,696
3 Claims. (Cl. 328—43)

This invention relates to pulse circuits, and more particularly to pulse circuits of the ring type with monitoring and correction features.

A wide variety of circuits have been proposed in the prior art for checking ring circuit operation. The main objective of most of these circuits usually is to provide an indication of incorrect performance, such as failure to step, the existence of multiple pulses or similar conditions, with no provisions being made for correction of the ring.

Where correction circuits have been proposed, they have involved expensive duplication of hardware in order to check one ring against another, or circuit arrangements of undue complexity. In addition, extra time has been required for some corrective procedures to take place, with consequent loss of ring operating time.

Accordingly, an object of the invention is to provide a pulse monitoring and correction circuit of simplified design.

Another object of the invention is to provide a pulse monitoring and correction circuit which functions in synchronism with the circuit being monitored so that no loss in operating time occurs.

An additional object of the invention is to provide a monitoring and correction circuit for a ring that indicates improper conditions within a single cycle of operation of the ring.

A further object of the invention is to provide a pulse circuit with means for checking the status of the circuit at a particular state of operation and to thereupon establish a predetermined status, if such has not occurred normally during the course of circuit operation.

An additional object of the invention is to provide a checking circuit for determining and indicating improper operation in a circuit being monitored.

In order to accomplish these and other objects of the invention, a pulse circuit has been provided with means for checking the circuit at a particular time during its cycle of operation, said means being operable to force the pulse circuit to assume a predetermined correct status at such time.

In addition, means have been provided in conjunction with a pulse circuit for detecting and indicating a catastrophic failure during operation of the circuit.

The foregoing and other objects, features, and advantages of the invention will be apparent from the following more particular description of the preferred embodiment of the invention as illustrated in the accompanying drawings.

In the drawings:

FIGURES 2, 3 and 4 represent circuit blocks that are used in the circuit of FIGURE 1.

CIRCUIT BLOCKS AND CONDITIONS

Figure 1:
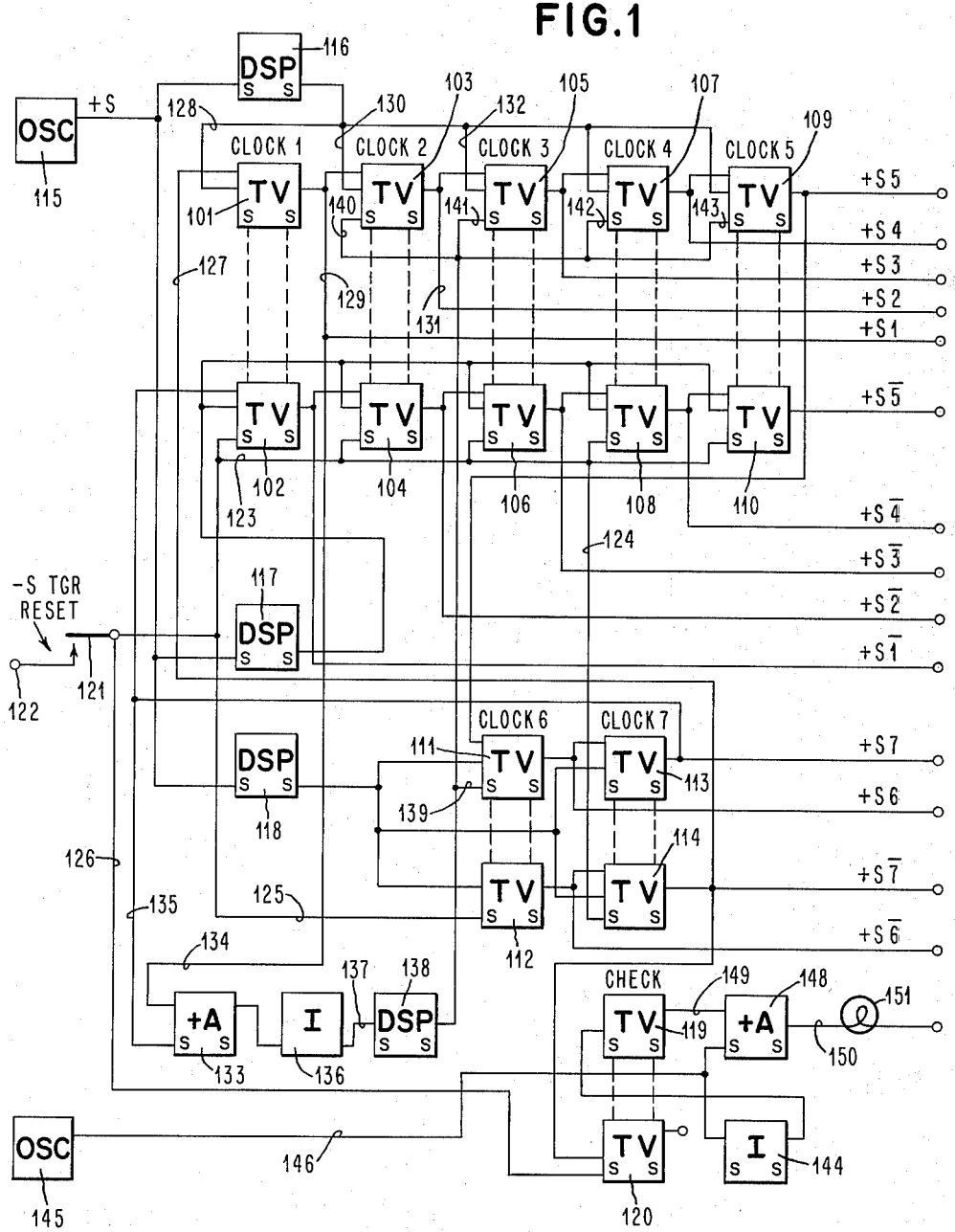
FIGURE 1 represents a pulse circuit with monitoring and correction facilities based on the principles of the invention.

FIGURES 2, 3 and 4 represent complementary transistor or NOR logic circuits which are used in the circuit of FIGURE 1. FIGURE 2 represents a two input circuit, which includes a PNP transistor 201.

NOR logic is well known in the art at the present time, and is described in numerous books and publications. A general treatise of this logic appears in the book "Design of Transistorized Circuits for Digital Computers," by A. I. Pressman, pages 190–220, published by John F. Rider Publisher, Inc.

Complementary transistor logic circuits are characterized by resistor input networks and inverted signal outputs. The transistors are usually operated in saturation when conducting. The logic of the block functional symbol is performed by the resistor input network, while the transistor inverts and amplifies the resistor network output.

The following voltage swings or lines are encountered:

| | | −S Level | +S Level |
|---|---|---|---|
| S Line | Minimum | −5.6 volts to | −.2 volts. |
| | Maximum | −12.0 volts to | +.3 volts. |

The circuit block of FIGURE 2 may be used for performing any one of three logical functions, that is, the complemented +AND function, the complemented −OR function, or the inversion function. When used for the inversion function, only one input line is used and the other input lines are left floating, or disconnected. The choice of which circuit to use depends on the number of inputs that have to be handled and the logical functions desired. With the component values and voltage levels shown, the functions of the circuit of FIGURE 2 are obtained in the following manner:

| Function | Inputs | Output |
|---|---|---|
| Complemented +AND | All inputs zero volts | −6 to −12 volts. |
| Complemented −OR | One or more inputs, −6 to −12 volts. | Zero volts. |
| Inverter | Single input, −6 to −12 volts. | Zero volts. |
| | Single input, Zero volts. (Remaining inputs, being disconnected are also at a zero level.) | −6 to −12 volts. |

Attention is now directed to the other circuits shown in FIGURE 3 and FIGURE 4.

TV TRIGGER

FIGURE 3 is a detailed diagram of the TV trigger which is used in the invention. Binary Operation: The trigger may be connected for binary operation (gated or not gated) by connecting one of the gate resistors to the emitter follower output on the same side of the trigger. The other gate input may be then used as an external gate or tied to ground. The two A.C. inputs 301 and 302 may be connected together and driven from a sample pulse driver to form the binary operation. As an alternative, separate resistor-capacitor-diode sets, such as elements 320, 321 and 322 are also provided for additional A.C. inputs as at terminals CA and NA.

A.C. Set Input at Terminal C: For gated input operation, the A.C. set pulse to pins 301 or 302 may be either a 3 v. or a 6 v. positive shift.

D.C. Set Input at Terminal 303: A signal of −5.56 v. (or more negative) applied to the D.C. set input triggers the circuit.

Assume a starting condition of transistors 304 and 305 in full conduction. Transistor 306 is at minimum conduction, and transistor 307 is OFF. With one gate (pin 308) tied to ground, pin (309) and the other gate (pin 310) gated from −6 v. to 0 v. for 4.5 μs. before the A.C. input shift is applied, a positive going 3 v. pulse of 0.5 µs. is applied to the A.C. set input (pin 301). The output of the gate at diode 311 causes the base of transistor 304 to become more positive than the emitter (ground potential). Transistor 304 becomes reverse-biased off and its collector voltage tries to go to —12 v. Because of the diode action between the collector and base of transistor 306, the collector of transistor 304 is allowed to go only to —6 v. (pin 312). This negative —6 v. forward biases emitter follower transistor 306 into full conduction. The emitter of the transistor 306 follows the base to —6 v. The output of 306 at pin 313 is coupled to the base of transistor 307 through the voltage divided resistors 314 and 315, forward biasing transistor 307. The conduction of 307 causes its collector (pin 316) to rise from —6 v. to 0 v. This collector voltage rise to 0 v. is fed to the base of transistor 305 and reduces the forward bias of 305. The reduced bias on 305, which is connected as an emitter follower, reduces its conduction so that its emitter rises to 0 v. The emitter output of 305 (0 v.) at pin 317 is coupled back to the base of 304 and holds reverse bias on 304, thus providing latch back to the circuit. If gating of pins 318 and 319 and an A.C. set pulse at pin 302 are applied, the trigger is flipped to its original state.

GATED SAMPLE PULSE DRIVER (DSP)

The gated sample pulse driver, FIGURE 4, provides about a 1 microsecond (µs.) output pulse regardless of the input signal duration. A gated, positive signal to either input terminal 401 or 402 starts the single-shot action.

The normal status of this circuit is: transistors 403 conducting, 404 partially conducting, 405 cut off, and output pin 406 at —9.5 v. The two inputs 401 and 402 are both conditioned by a single gate at pin 407 that must be up to 0 v. before either input can operate the circuit. The output expected is a 3 v. positive, 1 µs. pulse regardless of input signal duration in excess of 1 µs.

With the input gate pin 407 at 0 v. for more than 7.5 µs., a positive shift at input pin 401 cuts off transistor 403. The attempt to reduce current through a 200 µh. inductance coil 408 is resisted with a strong negative potential at the normally positive end of the coil. This negative spike passes through a 390 µµf. capacitor 409 and drives transistor 404 base negative. The emitter of 404 seeks to follow the base but is clamped by the emitter-base diode action of 405. The 404 is, in turn, clamped by the 404 emitter. Transistor 405 goes into full conduction and brings output pin 406 up to —6 v. This level is maintained while the 390 µµf. capacitor 409 charges to —5.2 v., through the 404 emitter-base junction and the 405 emitter-base junction. Transistor 405 is reverse-biased off when its base rises more positive than its emitter (—6.0 v.) and drops the output at pin 406 back to —9.5 v.

The input signal must extend beyond the 1 µs. period to allow the circuit to time out. The 390 µµf. capacitor 409 discharges through a 2K resistor 410.

The diode 411 in parallel with the inductor 408 prevents oscillation or ringing in the coil and speeds circuit recovery.

PULSE CIRCUIT WITH MONITORING AND CORRECTION MEANS

The pulse circuit of FIGURE 1 comprises a number of bistable devices that are interconnected to form a ring counter. The counter is regularly stepped by oscillator drive means to provide clock pulses and has auxiliary monitoring and correction means.

For illustrative purposes, the ring shown has seven positions, Clock 1 through Clock 7, although a lesser or greater number of positions could be used, depending on the application. The ring positions include co-acting pairs of TV blocks, designated 101–102, 103–104 through 113–114. Each position is considered to be ON, when the output of the upper TV block is +S.

The ring circuit is stepped by signals from a high-speed oscillator 15 which, typically, operates at a frequency rate in the range of one megacycle. The signals from the oscillator 115 alternate between +S and —S levels, with only the +S levels being effective to step the ring. The +S levels are changed to brief stepping pulses in Gated Sample Pulse Driver (DSP) blocks 116, 117 and 118 and these pulses are concurrently applied to all positions of the ring. The DSP blocks are included in the circuit to insure proper pulse and driving levels.

As previously discussed in connection with the TV trigger of FIGURE 3, each TV block has D.C. gating inputs as well as A.C. stepping inputs.

Ordinarily, only one of the seven ring stages will have a D.C. gating input conditioned for a change of state during any stepping interval.

Another pair of TV blocks of importance are designated 119 and 120, and together form a Check trigger, whose significance will be discussed shortly.

NORMAL OPERATION

A normal operation of the ring will first be considered. It will be assumed that all triggers in the circuit of FIGURE 1 are reset to their OFF condition. This is simply done by the manipulation of a switch 121 which directs a —S Reset level from terminal 122 to the D.C. Reset inputs of the lower TV blocks of all ring positions and also to the Check Trigger by lines 123–126.

True and complement +S levels, that is, +S1, +S$\bar{1}$, through +S7, +S$\bar{7}$, are supplied by the respective clock positions of the ring on the output lines generally indicated to the right in FIGURE 1.

The various true and complement levels +S1, +S$\bar{1}$ through +S7, +S$\bar{7}$ would ordinarily be applied to a decoding network, not shown, in order to derive fourteen distinct signals for controlling other circuits, such as data handling circuits in computer or communication networks.

With all trigger positions reset OFF, upper TV block 101 is gated by a +S$\bar{7}$ level on line 127. Therefore, the next +S pulse from DSP 116 on line 128 sets ring position Clock 1 ON.

A +S from Clock 1 on line 129 conditions upper TV block 103 of Clock 2 position. Clock 2 is set ON by a subsequent +S pulse on line 130 from DSP 116. Both Clock 1 and Clock 2 positions are now ON. The +S output from Clock 2 position on line 131 conditions upper TV block 105 of Clock 3. The next +S pulse from DSP 116 on line 132 sets Clock 3 position ON. Clock positions 1, 2 and 3 are now on.

By successive conditioning and stepping actions such as those just described, and with the circuit arrangement shown, the ring is stepped through fourteen unique conditions, including the reset condition, as tabulated below.

*Table I*

| Ring Clock Position | 1 | 2 | 3 | 4 | 5 | 6 | 7 |
|---|---|---|---|---|---|---|---|
| 1. Reset | 0 | 0 | 0 | 0 | 0 | 0 | 0 |
| 2 | 1 | 0 | 0 | 0 | 0 | 0 | 0 |
| 3 | 1 | 1 | 0 | 0 | 0 | 0 | 0 |
| 4 | 1 | 1 | 1 | 0 | 0 | 0 | 0 |
| 5 | 1 | 1 | 1 | 1 | 0 | 0 | 0 |
| 6 | 1 | 1 | 1 | 1 | 1 | 0 | 0 |
| 7 | 1 | 1 | 1 | 1 | 1 | 1 | 0 |
| 8 | 1 | 1 | 1 | 1 | 1 | 1 | 1 |
| 9 | 0 | 1 | 1 | 1 | 1 | 1 | 1 |
| 10 | 0 | 0 | 1 | 1 | 1 | 1 | 1 |
| 11 | 0 | 0 | 0 | 1 | 1 | 1 | 1 |
| 12 | 0 | 0 | 0 | 0 | 1 | 1 | 1 |
| 13 | 0 | 0 | 0 | 0 | 0 | 1 | 1 |
| 14 | 0 | 0 | 0 | 0 | 0 | 0 | 1 |

DETECTION AND CORRECTION OF ABNORMAL CONDITIONS

Several types of abnormal conditions can occur during ring operation.

One type of condition is that which occurs when a particular position of the ring fails to change condition on application of a first stepping pulse but does so on the next stepping pulse. Assume, for example, that Clock 1 and 2 are ON. Clock 3 position should step to its ON state upon the occurrence of the next +S pulse from DSP 116. If Clock 3 does not step at that time, the ring remains in a 1–1–0–0–0–0–0 condition, where the 0 and 1 symbols are the states of Clock positions 1–7, from left to right. Assume now that Clock 3 position does step upon the occurrence of the next following +S pulse from DSP 116. This results in one of the legal fourteen conditions of the ring, that is, 1–1–1–0–0–0–0. In this case, no corrective action becomes necessary, assuming, of course, that the ring thereafter continues to step from one legal state to another in a normal manner.

Another type of abnormal condition will be illustrated by assuming that the ring has stepped to 1–1–1–1–0–0–0, and that a random signal turns Clock 3 OFF. The ring condition is then 1–1–0–1–0–0–0, which is not a legal condition.

The OFF status of Clock 3 will circulate from one clock position to another around the ring.

In order to correct for this type of erroneous condition, a novel circuit arrangement has been provided, which includes the +AND block 133. +AND 133 has two input control lines. One input is line 134 from the +S1 output of Clock 1. Another input is line 135 from the +S7 output of Clock 7.

By reference to Table I above, it will be noted that both Clock 1 and Clock 7 are ON at the same time only at step 8. At that time, +AND 133 supplies a —S output to an Inverter (I) block 136 which becomes +S on line 137 to a Sample Pulse Driver (DSP) 138.

The output of DSP 138 is directed on lines 139–143 to alternative A.C. Set inputs of Clock positions 2 through 6. The net effect of the circuit action just described is to force Clock positions 2–6 to the ON state whenever Clock positions 1 and 7 are on. It is apparent that if an error of the second type did occur, corrective action would always be taken at Step 8 of Table I to insure a legal ring status. An output from +AND 133 at this time is conditional in nature, since no effect will be apparent if all Clock positions are already in the ON state. However, the corrective action described is always available at the particular state of the ring noted, whether needed or not.

It has been observed that regardless of the random change in state or combinations of changes in state of one or more triggers during the operation of the ring, Clock positions 1 and 7 will eventually be ON together in less than one full cycle time of fourteen steps, barring a catastrophic failure of the ring. In other words, even if random noise sets all positions to the OFF state, Clocks 1 and 7 will be on at the same time during at least one of the next successive fourteen steps.

Since this is true, a legal state of the ring can always be established in less than one cycle time of fourteen steps. Definite advantages are therefore provided from the standpoint of reliability of circuit operation and savings in time.

A particular output pulse combination, such as 1–1–1–1–1–1–1 in Table I, will always be established from the ring in response to the occurrence of a related unique pulse subcombination, which, in this case, is 1–0–0–0–0–0–1, in the event that the particular output combination has not occurred during normal operation of the ring.

CATASTROPHIC FAILURE INDICATION

Another condition that may be encountered during operation of the pulse circuit, is the catastrophic failure of a trigger position. If this happens, it is essential that an indication be provided so that external corrective action can be taken. This situation is handled in the arrangement of FIGURE 1 by a Check trigger and associated logic.

The Check trigger, which comprises TV blocks 119 and 120 is initially set to its ON state by a +S signal from an Inverter (I) block 144 that results from a —S signal from a low-speed oscillator 145 on line 146. The low-speed oscillator 145 supplies +S and —S levels during alternate half cycles on line 146. The frequency of the oscillator 145 is selected so that its basic pulse time interval, from the occurrence of one —S level to the next —S level, for example, is greater than twice the fourteen-step cycle time of the ring. If the frequency of the high-speed oscillator 115 is 1 megacycle, one complete ring cycle would encompass 14 microseconds. The cycle time of the low-speed oscillator should therefore be greater than twice the interval of 14 microseconds, or greater than 28 microseconds.

In this case, a low-speed oscillator frequency of 1000 cycles per second, for example, would be satisfactory, since the cyclic interval involved is 1000 microseconds.

The relationships of the high speed and low speed frequencies are established as described in order to insure that the ring has had a complete cycle of operation, and to avoid false indications from the Check trigger.

If the Check trigger is set by a —S level from oscillator 145, it should next be reset by a +S7 level from Clock 7 on line 147. A reset signal from another Clock position would work just as well. The +S7 level occurs when Clock 7 changes to its OFF state during stepping of the ring. This indicates that the ring is stepping through its cycle, and that no failure has occurred.

The +S level from oscillator 145 that occurs during the next low speed half cycle is applied to one input of a +AND block 148. If the Check trigger was properly reset during the first low speed half cycle by Clock 7 going OFF, the Check trigger output on line 149 is —S, and no output occurs from +AND 148.

If no +S7 occurred to reset the Check trigger during the low speed —S half cycle, its output on line 149 would then be +S during the +S half cycle of the low-speed oscillator. An output on line 150 results in the energization of a lamp 151 to indicate that a catastrophic failure of a ring position has occurred.

It is apparent that the present invention provides advantages not present in the prior art. The arrangements not only provide detection of erroneous pulse circuit conditions in the conventional sense, but also automatically establish a predetermined legal state in the ring in response to predetermined states of selected ones of its member stages.

The action involved is conditional in that it is effective only if required, but it is available if needed during each and every ring cycle.

If not already in a legal state, the ring is forced to assume a predetermined legal state within one cycle of operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pulse monitoring and correction circuit, comprising:

a first source of high frequency actuating pulses;

a ring circuit including a number of bistable elements, each of said elements being settable to one or another of two conditions when properly gated, and each of said elements supplying a binary pulse output dependent on its condition;

means under control of said actuating pulses for establishing a predetermined sequence of pulse combination outputs from said elements during a cycle of operation of said ring;

monitoring means for determining particular conditions of selected ones of said elements;

means activated by said monitoring means for enforcing particular conditions in the remainder of said elements in order to establish a particular pulse combination output;

a second source of pulses having a low speed frequency cycle that encompasses at least two cycles of operation of said ring;

a ring failure dectection circuit settable to a first state under control of a pulse from said second source during each said low speed cycle;

means for applying an output from a particular element of said ring to reset said detection circuit to a second state during a cycle of operation of said ring;

and means activated by said detection circuit when it has remained in its said first state for indicating a failure of said ring to step.

2. A pulse monitoring and correcting circuit comprising:

a source of actuating pulses;

a ring circuit including a plurality of bistable elements, each element being settable by said actuating pulses to either a "set" or a "reset" state, interconnections between adjacent elements of said ring whereby each element except a last element when set in either state enables the next element of said ring, if said next element is in an opposite state, to respond to an actuating pulse and thereby become set to a corresponding state and further interconnections from the last element to the first element whereby said last element when set to the same state as said first element enables said first element to respond to an actuating pulse and thereby become set to a state opposite to the state of said last element;

means for applying said actuating pulses to all said bistable elements to effect a change in the state of the ones of said elements which are enabled to respond to said pulse, whereby said elements of said ring circuit will be cyclically energized through a plurality of combinations of "set-reset" states, a desired one of said states being a configuration with all said elements being "set";

monitoring means to detect a "set" state of both said first and said last bistable elements;

a correction pulse producing means energized by said monitoring means when said state is detected, means connecting said correction pulse producing means to all other bistable elements to set any element which is in an erroneous "reset" condition to the "set" condition, means to indicate that said ring circuit is not responding to said actuating pulses;

a source of pulses having a relatively long period of at least twice the cyclic frequency of said ring circuit;

an extra bistable element set by a transition of said pulse source from an upper to a lower output level and reset by said last bistable element when in the "reset" state and a gate circuit controlled by said extra bistable element when set and by the upper output level of said long period pulse source to energize said indicating means.

3. A pulse monitoring and correcting circuit comprising:

a source of actuating pulses;

a ring circuit including a plurality of bistable elements, each element being settable by said actuating pulses to either a "set" or a "reset" state, interconnections between adjacent elements of said ring whereby each element except a last element when set in either state enables the next element of said ring, if said next element is in an opposite state, to respond to an actuating pulse and thereby become set to a corresponding state and further interconnections from the last element to the first element whereby said last element when set to the same state as said first element enables said first element to respond to an actuating pulse and thereby become set to a state opposite to the state of said last element;

means for applying said actuating pulses to all said bistable elements to effect a change in state of the ones of said elements which are enabled to respond to said pulse, whereby said elements of said ring circuit will be cyclically energized through a plurality of combinations of "set-reset" states, a desired one of said states being a configuration with all said elements being "set";

monitoring means coupled to only said first and last bistable elements to detect a "set" state of both said first and said last bistable elements;

a correction pulse producing means energized by said monitoring means when said state is detected and means connecting said correction pulse producing means to all other bistable elements to set any element which is in an erroneous "reset" condition to the "set" condition.

References Cited by the Examiner
UNITED STATES PATENTS

| | | | |
|---|---|---|---|
| 2,762,915 | 9/56 | Bagley | 328—48 |
| 2,931,922 | 4/60 | Tubinis | 307—88.5 |
| 3,050,714 | 8/62 | Campbell | 328—48 |
| 3,051,855 | 8/62 | Lee | 307—88.5 |
| 3,064,890 | 11/62 | Butler | 328—48 |

ARTHUR GAUSS, *Primary Examiner.*